United States Patent [19]

Papadopoulos

[11] Patent Number: 5,544,243
[45] Date of Patent: Aug. 6, 1996

[54] TELEPHONE HEADSET INTERFACE CIRCUIT

[75] Inventor: Costas Papadopoulos, Acton, Mass.

[73] Assignee: VXI Corporation, Rollinsford, N.H.

[21] Appl. No.: 288,941

[22] Filed: Aug. 10, 1994

Related U.S. Application Data

[63] Continuation-in-part of Ser. No. 62,595, May 17, 1993.

[51] Int. Cl.⁶ ..................................................... H04M 9/00
[52] U.S. Cl. ........................... 379/413; 379/395; 379/387
[58] Field of Search ............................... 379/413, 348, 379/156, 395, 93, 98, 387, 165, 399, 412

[56] References Cited

U.S. PATENT DOCUMENTS

| | | | |
|---|---|---|---|
| 3,733,441 | 5/1973 | McCorkle et al. | 379/395 |
| 3,781,492 | 12/1973 | Cragg et al. | 179/156 A |
| 3,786,200 | 1/1974 | Camenzind | 330/1 R |
| 4,087,647 | 5/1978 | Embree et al. | 379/413 |
| 4,306,119 | 12/1981 | Kutzavitch | 379/412 X |
| 4,395,590 | 7/1983 | Pierce et al. | 379/387 X |
| 4,420,657 | 12/1983 | Larkin | 179/156 A |
| 4,536,888 | 8/1985 | Wilson | 381/106 |
| 4,653,088 | 3/1987 | Budd et al. | 379/165 |
| 4,685,129 | 8/1987 | Gavrilovich | 379/413 X |
| 4,754,484 | 6/1988 | Larkin | 379/430 |
| 4,777,645 | 10/1988 | Faith et al. | 379/31 |
| 4,782,524 | 11/1988 | McQuinn et al. | 379/395 |
| 4,803,719 | 2/1989 | Ulrich | 379/413 X |
| 4,819,263 | 4/1989 | Franklin | 379/390 |
| 4,839,917 | 6/1989 | Oliver | 379/45 |
| 4,879,746 | 11/1989 | Young et al. | 379/399 |
| 4,882,745 | 11/1989 | Silver | 379/61 |
| 4,893,331 | 1/1990 | Horiuchi et al. | 379/93 |
| 4,916,735 | 4/1990 | Iida et al. | 379/413 |
| 4,917,504 | 4/1990 | Scott et al. | 381/187 |
| 4,918,726 | 4/1990 | Snyder | 379/395 |
| 4,928,306 | 5/1990 | Biswas et al. | 379/391 |
| 4,930,156 | 5/1990 | Norris | 379/388 |
| 4,951,002 | 8/1990 | Hanon | 330/151 |
| 4,975,949 | 12/1990 | Wimsatt et al. | 379/387 |
| 5,036,536 | 7/1991 | Hanon et al. | 379/387 |
| 5,058,155 | 10/1991 | Leo Larsen | 379/442 |
| 5,099,514 | 3/1992 | Acree | 379/441 |
| 5,125,032 | 6/1992 | Meister et al. | 381/183 |
| 5,128,982 | 7/1992 | Dugdale et al. | 379/89 |
| 5,185,789 | 2/1993 | Hanon et al. | 379/385 |

*Primary Examiner*—Jeffery Hofsass
*Assistant Examiner*—Devendra Kumar
*Attorney, Agent, or Firm*—Samuels, Gauthier, Stevens & Reppert

[57] ABSTRACT

A telephone headset interface circuit is coupled to a telephone line to extract power for use by a headset amplifier and is particularly adapted for use with telephone handsets having dynamic or electret microphones. The telephone line connects a telephone to a service system, such as a Central Office, a PBX system, or a Key system. The interface circuit includes a power extraction circuit having a plurality of circuit portions, each one coupled to a corresponding one of the telephone line wires for providing a predetermined output voltage, so that substantially identical electrical impedance characteristics are introduced to each such wire. A power compensation circuit is coupled to both a first and second pair of wires of the system for controlling the power extraction circuit to provide the predetermined output voltage in response to the presence of AC voltage on the second pair of wires, such that the power compensation circuit controls the power extraction circuit to maintain substantially the same electrical impedance characteristics to the first pair of wires regardless of the presence or absence of AC voltage on the second pair of wires. An isolation circuit is coupled to the outputs of the power extraction circuit portions for preventing shunt loading of the first and second pairs of wires and for providing electrical impedance characteristics to the first and second pairs of wires representative of an open circuit.

13 Claims, 8 Drawing Sheets

TELEPHONE HEADSET INTERFACE CIRCUIT

This is a continuation-in-part of copending application Ser. No. 08/062,595 filed on May 17, 1993.

FIELD OF THE INVENTION

This invention relates generally to telephone headset apparatus and more particularly, to a headset interface circuit for powering a headset amplifier by diverting power from a telephone line.

BACKGROUND OF THE INVENTION

As is known in the art of telephony, headsets are often used where the need arises for "hands-free" telephone operation. Some workers who widely utilize telephone headsets are telephone switchboard operators, travel agents, and telephone salespersons. Telephone apparatus which adapts a telephone for either handset or headset operation includes a transfer switch for selecting the desired operation and an amplifier for adjusting the volume of the voice signals transmitted to and received by the headset. Often, an amplifier module houses both the headset amplifier and the transfer switch. Such a module typically accommodates three connections: a first to the handset connector of the telephone instrument, a second to the telephone handset, and a third to the headset. In operation, when the transfer switch is in a first position, corresponding to handset operation, the module "bypasses" the telephone line signals through the telephone and to the handset to permit transmission between the service system and the handset. Alternatively, when the transfer switch is in a second position, corresponding to headset operation, signals passing between the telephone service system and the headset are amplified by the headset amplifier.

As is also known, the way in which the requisite power for operating the headset amplifier is derived has been a function of the type of telephone service system to which the telephone is connected. For example, the telephone may be connected to a Central Office system directly or alternatively, may be connected to an intermediate electronic telephone system, such as a Private Branch Exchange (PBX) or a Key system.

When a telephone is connected directly to a Central Office, ample power for operating the headset amplifier is available from the telephone. That is, when the handset is "off hook", between approximately 20 and 120 milliamps of current flows through the telephone, so that diverting the few milliamps generally necessary to power the headset amplifier does not pose a problem. However, in the case of electronic service systems, powering the headset amplifier cannot be achieved in the same manner. More particularly, when an electronic telephone goes off hook, as little as nine milliamps may flow. Thus, diverting the few milliamps necessary to power the headset amplifier is not feasible since telephone performance may be sacrificed. Conventionally, powering headset amplifiers used in conjunction with an electronic telephone service system has been achieved with an external power source, such as batteries or an AC power line.

When the handset is of one conventional type having a dynamic microphone, batteries may be a costly and inefficient way of powering the headset amplifier. That is, a dynamic microphone, having a winding and permanent magnet arrangement, does not have a sufficient signal voltage associated therewith with which to detect whether the handset is off hook and thus, whether the amplifier should be powered. If the transfer switch is in the headset position, the amplifier remains powered longer than necessary draining the batteries. While the use of an AC line to power the amplifier of a headset having a dynamic microphone is suitable, the headset user may find it objectionable to be "plugged in" to the AC wall outlet. Some headset amplifiers have the capability of operating from either battery or AC power sources, however, such does not overcome the respective disadvantages associated with either battery and AC line powering of the headset amplifier.

Headset amplifiers adapted for use interchangeably with different available handset types are typically referred to as Universal Amplifiers. Such amplifiers are manually preconfigured by the user in accordance with the particular microphone type and wiring arrangement. In the case of telephones employing carbon microphones, ample power is available at the handset connector to drive a headset amplifier. However, such is often not the case with handsets employing dynamic or electret microphones.

SUMMARY OF THE INVENTION

In accordance with one embodiment of the present invention, a telephone interface for use with a telephone having a first connector for connection to a telephone and a second connector for connection to a telephone voice accessory is provided. The telephone line includes at least a first and second pair of wires. The telephone interface includes a power extraction circuit coupled to the first pair of wires for providing a predetermined output voltage in response to a specified DC voltage provided on the first pair of wires and in the absence of AC voltage on the second pair of wires. A power compensation circuit is coupled to both the first and second pairs of wires for controlling the power extraction circuit to provide the predetermined output voltage in response to the presence of AC voltage on the second pair of wires. The power compensation circuit controls the power extraction circuit to maintain substantially the same electrical impedance characteristics to the first pair of wires regardless of the presence or absence of AC voltage on the second pair of wires. An amplifier is coupled to the second connector and to the power extraction circuit, the amplifier being powered by the output voltage.

In an alternative embodiment of the present invention, there is provided a telephone interface for use with a telephone having a first connector for connection to a telephone line and a second connector for connection to a telephone voice accessory, wherein the telephone line includes at least a first and second pair of wires, the telephone being powered by a DC voltage of one polarity provided on the first pair and the DC voltage of the opposite polarity on the second pair. The telephone interface includes a power extraction circuit coupled to the first and second pairs of wires and having first and second output terminal sets for providing portions of a predetermined output voltage of one polarity on the first output terminal set and of the opposite polarity on the second output terminal set. An isolation circuit is provided coupled to both the first and second output terminal sets for preventing shunt loading of the first and second pairs of wires and for providing electrical impedance characteristics to the first and second pairs of wires representative of an open circuit. The isolation circuit is further operable for combining the portions into said output voltage. An amplifier is coupled to the second connector and to the isolation circuit, the amplifier being powered by the output voltage.

BRIEF DESCRIPTION OF THE DRAWINGS

The invention may be more fully understood from the following detailed description of the drawings in which.

DESCRIPTION OF THE PREFERRED EMBODIMENT

Figure 1:
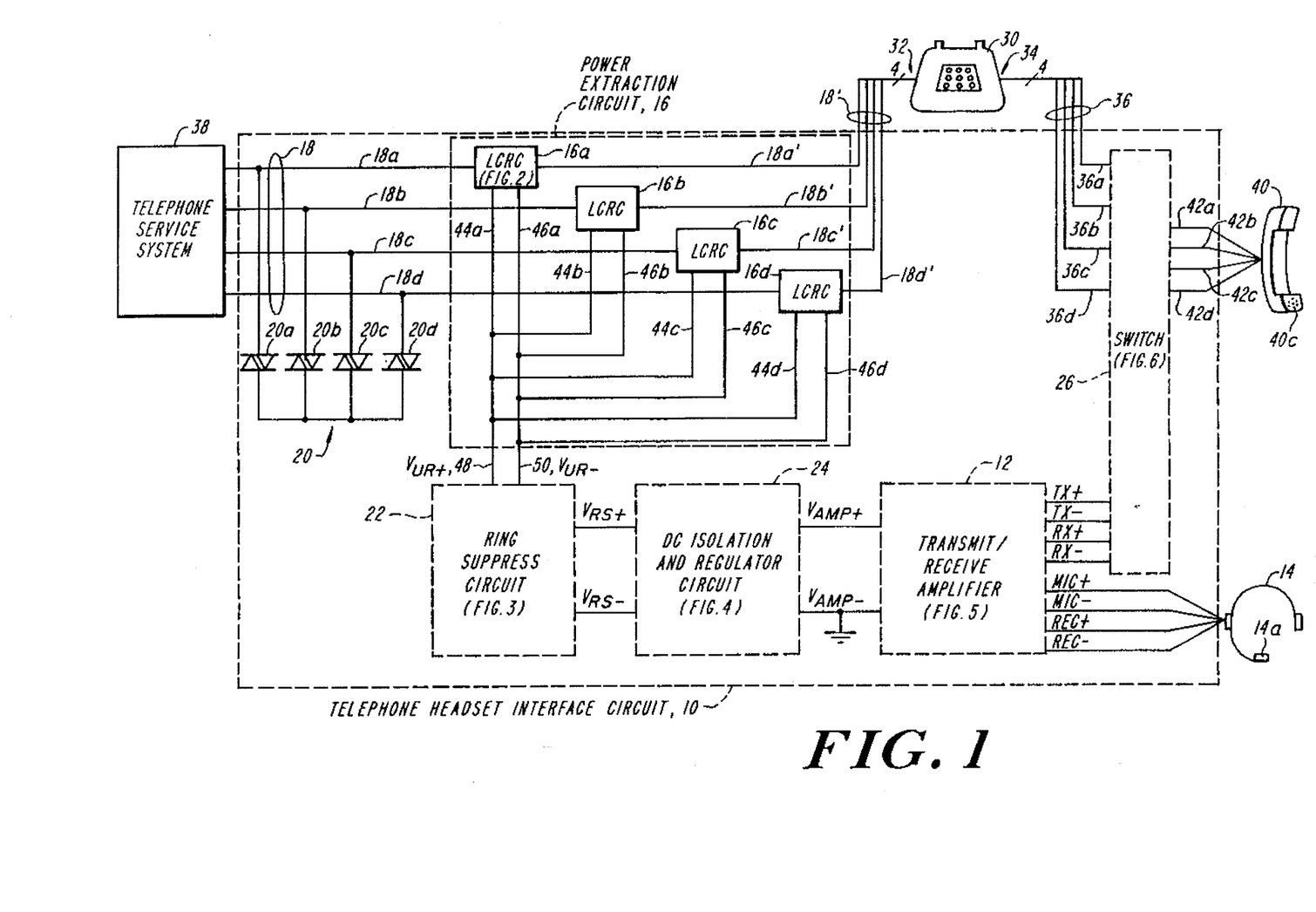
FIG. 1 is a block diagram of a telephone headset interface circuit in accordance with the invention.

Referring to FIG. 1, a telephone headset interface circuit 10 includes a transmit and receive amplifier 12, adapted for coupling to a headset 14, in order to adjust the amplitude of signals coupled between the headset 14 and telephone lines 18. The interface circuit 10 further includes a power extraction circuit 16 for extracting power from the telephone lines 18 to power the amplifier 12. Additionally, the telephone headset interface circuit 10 includes a voltage protection circuit 20, a ring suppress circuit 22, a DC isolation and regulator circuit 24, and a switch 26.

The interface circuit 10 is adapted for coupling to a handset 40, a headset 14, a telephone 30, and the telephone lines 18, including individual lines or wires 18a–18d. Fuses (not shown) may be inserted in series with telephone lines 18 to facilitate compliance with FCC Part 68 testing requirements. A first connector or port 32 of the telephone 30, conventionally coupled directly to the telephone lines 18, is coupled to the telephone lines 18 through the power extraction circuit 16. A second connector 34 of the telephone 30 is coupled to the switch 26 via signal lines 36, including individual wires 36a–36d. Switch 26 will be described in greater detail below in conjunction with FIG. 6. Suffice it here to say however, that switch 26 permits selection of either headset 14 or handset 40 operation. Additionally, switch 26 provides for compatibility of the telephone headset interface circuit 10 with different types of telephones 30 (i.e., having different wiring configurations of the telephone lines 36 coupled between the telephone 30 and the handset 40).

The voltage protection circuit 20 includes a plurality of varistors 20a–20d for clamping the telephone line voltage in order to protect the interface circuit 10. More particularly, each of the varistors 20a–20d has a first terminal coupled to a corresponding one of telephone wires 18a–18d and a second terminal coupled to the second terminal of the other ones of varistors 20a–20d, as shown. With this arrangement, the voltage breakdown characteristic of each of varistors 20a–20d is one-half of the necessary "line to line" voltage breakdown. Stated differently, if varistors 20a–20d were coupled directly between any two of the wires 18a–18d, the equivalent voltage breakdown rating would be twice the value of the present arrangement. The characteristic breakdown voltage associated with varistors 20a–20d is selected to be low enough to protect the interface circuit 10, such as in the case of power surges, but high enough to prevent breakdown during ringing by a directly connected Central Office service system 38. A Central Office ringing voltage is typically a twenty Hertz, 200 volt peak to peak signal. When the voltage on any of telephone lines 18a–18d exceeds approximately 480 volts peak to peak, the corresponding one of varistors 20a–20d breaks down, clamping the voltage of the corresponding line 18a–18d to that of another corresponding line. The voltage of the varistors 20a–20d is selected so as not to affect the ringing voltage and to protect the interface circuit 10 without substantial overrating of components. In this way, excessive voltage is prevented from damaging the interface circuit 10 or the telephone 30.

Interface circuit 10 is coupled to a telephone service system 38 via telephone lines 18 and is adaptable for coupling to any one of a Central Office service system, an electronic Private Branch Exchange (PBX) service system, or an electronic Key service system. Telephone lines 18 connect to a telephone wall jack (not shown), for example in a subscriber's home. Power is extracted by circuit 16 from the telephone lines 18 for use by the headset amplifier 12, as will be described. Suffice it here to say that the desired extracted power to be supplied to the amplifier 12 is approximately 2.0 volts and approximately 3.0 milliamps.

Power extraction circuit 16 includes a plurality of power extraction circuits portions 16a–16d, referred to herein as a loop current rectifier circuits (LCR circuits), each coupled to a corresponding one of telephone wires 18a–18d, respectively. Specifically, each of LCR circuits 16a–16d is coupled between one of the telephone wires 18a–18d and a corresponding one of substantially identical telephone line wires 18a'–18d'. Telephone lines 18' are further coupled to the connector 32 of the telephone 30, as shown.

In order to accommodate the different telephone service systems 38 noted above, interface circuit 10 must be operable over a wide range of telephone line voltages and currents and must be compatible with telephone lines 18 having different wiring arrangements, as described below. Moreover, regardless of the type of service system 38 to which telephone 30 and interface circuit 10 are coupled, it is desirable that the circuit 10 be transparent to both the service system 38 and the telephone 30. To this end, minimal interference with the telephone line signals, including voice, data, and control signals, is desirable.

Central Office telephone lines carry approximately fifty volts nominally when the coupled telephone 30 is "on hook" and between approximately 6–8 volts when such telephone 30 is "off hook." Current from the Central Office flows through the telephone 30 when the telephone 30 is off hook (i.e., a DC current flow) and when the telephone 30 is ringing (i.e., an AC current flow), but not when the telephone 30 is on hook and not ringing. More particularly, the telephone 30 is rung by a 200 Vac "ringing" voltage provided by the Central Office. An additional factor that must be considered when coupling the power extraction circuit 16 to a Central Office telephone line is FCC compliance. More particularly, compliance with Tile 47 of the Code of Federal Regulations, Part 68 is required. The provisions of 47 CFR 68 govern, inter alia, parameters such as the maximum permissible load on the lines 18 when the telephone is ringing, when the telephone is off hook, or when the telephone is on hook.

With an electronic PBX telephone service system, the line voltage is typically around forty volts (i.e., thirty-six, forty, forty-eight) and only the value of line current may change from an on hook to an off hook condition. More particularly, when the telephone 30 coupled to a PBX service system is on hook, the line current is approximately five milliamps; whereas, when the telephone 30 is off hook, the line current is approximately nine milliamps. In some PBX systems, the telephone 30 rings in response to a digital data signal transmitted over the lines 18.

In an electronic Key system, like a PBX, current may flow continuously on the telephone lines 18 and through the telephone 30. That is, current flows in both on hook and off hook conditions. A typical Key system has a continuous current of approximately thirty milliamps and a line voltage of approximately thirty-two volts associated therewith. Current in Key systems may flow wire to wire within a pair or from one pair to another pair.

In order to accommodate connections to any of the above described service systems 38, an LCR circuit 16a–16d is provided for coupling to each of the telephone wires 18a–18d. For example, Central Office and some PBX service systems have only one pair of active wires, such as wires, 18b, 18c associated therewith. In this case, providing an LCR circuit for coupling to each of such lines 18b, 18c requires only two LCR circuits 16b, 16c. On the other hand, in the case of electronic Key systems and some PBX systems, each of four wires 18a–18d is active. However, even in telephone systems where all four wires 18a–18d are used, such wires 18a–18d are not necessarily dedicated to the same use in all such systems. For example, in one type of Key system, wires 18a and 18b comprise a wire pair carrying voice information or signals and wires 18c and 18d comprise a wire pair carrying data signals. In an alternative type of Key system however, wires 18b and 18c comprise the wire pair carrying voice signals and wires 18a and 18d comprise the wire pair carrying data signals. Moreover, some Key systems (not shown) may include more than four wires 18a–18d. However, in the case where more than the four wires 18a–18d are used, providing four LCR circuits 16a–16d coupled to four corresponding wires 18a–18d, as shown, is sufficient. That is, the four LCR circuits 16a–16d extract the requisite power to drive the headset amplifier 12.

From the above, it is understood that the number of LCR circuits may be specifically tailored to a particular telephone service system. However, it is preferable that the interface circuit 10 be compatible with any such systems in order to simplify manufacture by providing a single interface circuit 10 accommodating any such system. To this end, an LCR circuit 16a–16d is associated with each of four wires 18a–18d, respectively, and use of the interface circuit 10 with service systems 38 having only two wires 18b, 18c or having six or more wires is in no way compromised. Thus, employing four LCR circuits 16a–16d for coupling to four wires 18a–18d provides compatibility for use with various service systems 38 in which the number of active wires 18a–18d and the arrangement thereof differs. Compatibility of headset interface circuit 10 with any of the described service system types is achieved by coupling a separate power extracting LCR circuit 16a–16d to each of the telephone lines 18a–18d.

Another advantage of the present arrangement in which LCR circuits 16a–16d are coupled to corresponding telephone wires 18a–18d is that substantially identical electrical impedance characteristics are thereby introduced to each wire 18a–18d. More particularly, preferably both AC and DC impedance characteristics introduced to each of telephone wires 18a–18d are substantially identical. With this arrangement, degradation of the telephone performance is minimized.

Due to the wiring variations that may be encountered, LCR circuits 16a–16d are "direction independent" so that the circuits 16a–16d operate in a like manner to extract power from the corresponding one of telephone lines 18a–18d, regardless of whether the circuit is connected to one of the lines 18a–18d by which information is transmitted from the service system 38 to the telephone 30 or from the telephone 30 to the service system 38.

Figure 2:
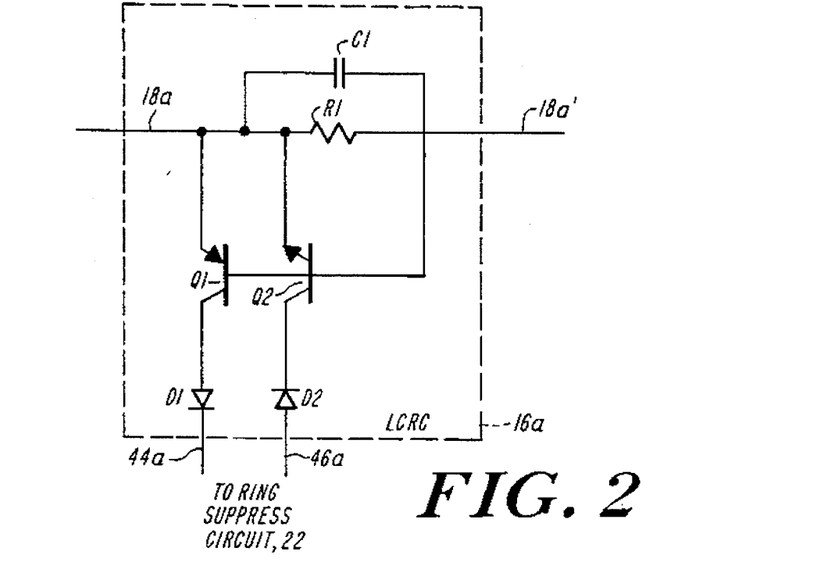
FIG. 2 is a schematic of an exemplary loop current rectifier circuit (LCR circuit) of FIG. 1.

Referring now also to FIG. 2, the power extraction circuit 16 will be described in conjunction with exemplary LCR circuit 16a. LCR circuit 16a is serially coupled between corresponding telephone lines 18a and 18a' as shown, and provides DC current on one of the two lines 44a or 46a depending on the direction of current in lines 18a, 18a'. In one embodiment, LCR circuit 16a advantageously includes a resistor R1 coupled in parallel with a capacitor C1 although it is understood that the circuit can be constructed without resistor R1. In this embodiment, once enough current flows to cause a voltage drop of approximately 0.6 volts between the base and emitter of transistors Q1 and Q2, one of the transistors Q1, Q2 conducts. Note that the one of the transistors Q1, Q2 that conducts in response to a 0.6 volt drop depends on the direction of the current flow on telephone lines 18a, 18a'. For example, if current is flowing from the telephone system 38 to the telephone 30 sufficient to drop 0.6 volts across resistor R1, the base to emitter junction of transistor Q1 is forward biased; whereas, when current is flowing from the telephone 30 to the telephone system 38 sufficient to drop 0.6 volts across resistor R1, it is the base to emitter junction of transistor Q2 that is forward biased. In either case, once one of the transistors Q1, Q2 conducts, current is diverted from telephone lines 18a, 18a' to the ring suppress circuit 22 via unregulated power lines 44a, 46a. Diodes D1, D2 are coupled in series with a respective one of transistors Q1, Q2, as shown, in order to provide isolation. More particularly, diodes D1, D2 prevent the base to collector junction of the one of transistors Q1, Q2 which is in a non-conducting state from conducting.

It is desirable that the power extraction circuit 16 be enabled (i.e., power diverted) when as little as approximately 0.5 milliamps flows through telephone lines 18 even though the lowest off hook line current is approximately nine milliamps (i.e., in the case of a PBX system). This is because the ring suppress circuit 22 is provided to sense the presence of a ringing voltage on lines 18 and such ringing voltage may have a current of approximately 1.0 milliamp associated therewith (i.e., in the case of a typical Central Office ringing voltage). Thus, in order to reliably detect such ringing voltage, the LCR circuits 16a–16d are enabled when as little as 0.5 milliamps is present on lines 18. To this end, resistor R1 is approximately 1.5 Kohms, so that one of transistors Q1, Q2 conducts when approximately 0.4 milliamps flows through telephone lines 18. Or stated differently, when approximately 0.4 milliamps of current flows, 0.6 volts is dropped across resistor R1, thereby forward biasing one of transistors Q1, Q2.

In order to achieve substantial "transparency" of the interface circuit 10 to both the telephone system 38 and the telephone 30, a minimum voltage drop is introduced between lines 18, 18', such as substantially less than 2.0 volts. The voltage drop across resistor R1 is equal to the $V_{BE}$ of the conducting one of transistors Q1, Q2, or approximately 0.6 volts. This relatively low voltage drop between telephone lines 18, 18' is desirable for several reasons. First, in the case where the telephone lines 18 are directly connected to a Central Office service system, the on hook voltage thereon is nominally between 6.0 and 8.0 volts. In this case, it is imperative that only a relatively low voltage drop be introduced between the lines 18 and 18' since otherwise, the performance of telephone 30 may be sacrificed. Additionally, even in the configuration of PBX or Key system coupled telephone lines 18 (i.e., where the off hook voltage is approximately forty and thirty-two volts, respectively), the system may nevertheless be sensitive to voltage drops. For example, such systems may initiate diagnostic routines in order to determine if the sensed voltage drop is indicative of a telephone system failure.

Capacitor C1 is disposed in parallel with resistor R1 to pass AC signals between telephone lines 18, 18' in order to avoid data signal degradation. More particularly, it has been found that in certain PBX service systems, data signals may be degraded by serial coupling through resistor R1 and base to emitter junctions of transistors Q1, Q2. With capacitor C1, such data signals are AC coupled across resistor R1 and thus, are not adversely affected. Capacitor C1 is approximately 33.0 microfarads.

Referring briefly back to FIG. 1, it is noted that each of the LCR circuits 16b–16d operates in a like manner to exemplary LCR circuit 16a described above. Thus, each of LCR circuits 16b–16d is coupled between corresponding telephone lines 18b, 18b'–18d, 18d', respectively, and provides unregulated power on power lines 44b, 46b–44d, 46d. The unregulated power lines 44a, 46a–44d, 46d of each of the LCR circuits 16a–16d are interconnected to provide a single, unregulated power line pair 48, 50 to the ring suppress circuit 22, as shown. The positive one 48 of the unregulated power line pair 48, 50 is labelled $V_{UR+}$ and the negative one 50 thereof is labelled $V_{UR-}$.

Figure 3:
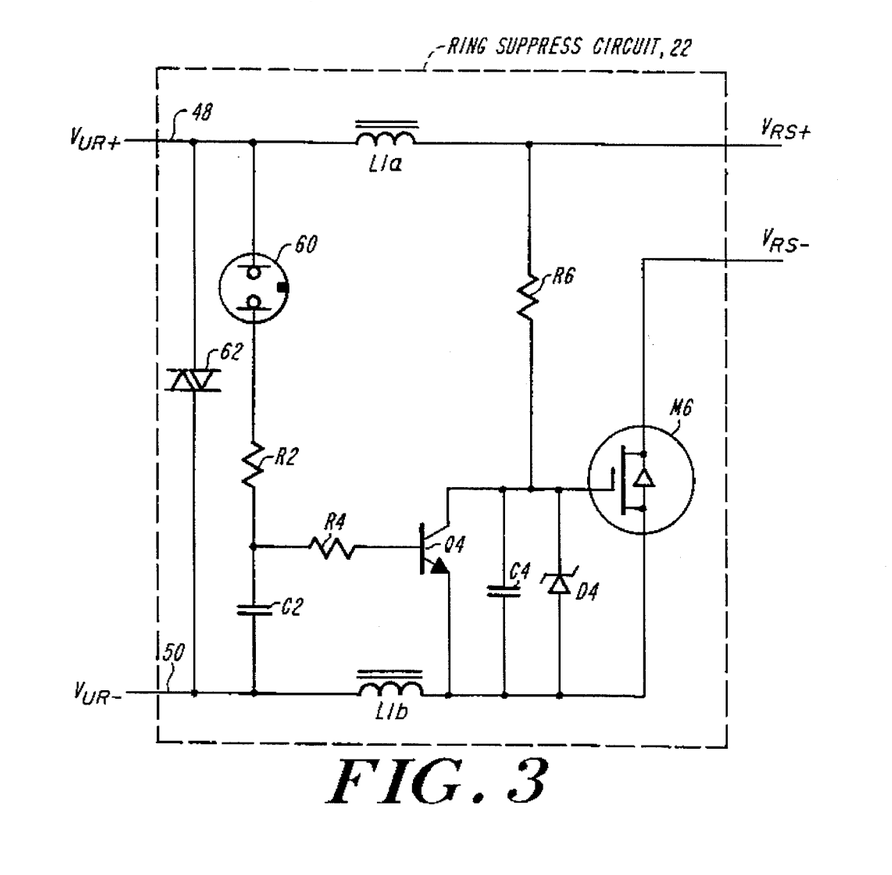
FIG. 3 is a schematic of the ring suppress circuit of FIG. 1.

Referring now to FIG. 3, the ring suppress circuit 22 receives unregulated voltage $V_{UR+}$, $V_{UR-}$ and provides ring suppressed voltage $V_{RS+}$, $V_{RS-}$. The purpose of the ring suppress circuit 22 is to ensure that when the telephone 30 is ringing (i.e. when a ringing voltage is present on telephone lines 18), the power extraction circuit 16 does not divert power to the transmit/receive amplifier 12. That is, upon detection of a ringing voltage, the ring suppress circuit 22 decouples the unregulated voltage $V_{UR+}$, $V_{UR-}$ from the DC isolation and regulator circuit 24 and thus, also from the amplifier 12, so that the transmit/receive amplifier 12 is prevented from loading the telephone lines 18. On the other hand, in both off hook operation and non-ringing, on hook operation with loop current present, the ring suppress circuit 22 simply passes the unregulated DC voltage $V_{UR+}$, $V_{UR-}$ therethrough to provide the ring suppressed voltage $V_{RS+}$, $V_{RS-}$. In this way, ringing is not detrimentally interfered with. That is, considering the use of the interface circuit 10 in the absence of the ring suppress circuit 22, upon detection of a current flow (albeit associated with a ringing voltage), the transmit/receive amplifier 12 would be powered, thereby diverting power from the lines 18 which may cause the telephone 30 to stop ringing prematurely. Put a different way, without the ring suppress circuit 22, it is possible that the ringing of the telephone 30 would cease even though the telephone 30 was not taken off hook.

Ring suppress circuit 22 includes a neon lamp 60, for sensing a ringing voltage on telephone lines 18 and decoupling the unregulated voltage $V_{UR+}$, $V_{UR-}$ from the DC isolation and regulator circuit 24 in response thereto. More particularly, once approximately 135 volts is impressed across lamp 60, the neon lamp 60 breaks down, effectively changing from an open circuit to a low impedance conducting state. With the neon lamp 60 conducting, the base to emitter junction of transistor Q4 is forward biased to a conducting state. The collector of transistor Q4 is coupled to the gate of FET M6 so that the conduction of transistor Q4 causes FET M6 to be turned off. With this arrangement, an open circuit is provided between $V_{RS+}$ and $V_{RS-}$, or in other words, $V_{UR+}$, $V_{UR-}$ is decoupled from the transmit/receive amplifier 12.

A varistor 62 is optionally coupled in parallel with neon lamp 60 to provide additional protection to the circuit 22 in the case of an overvoltage condition. Varistor 62 will clamp the unregulated voltage lines 48, 50 to prevent the voltage differential between such lines from exceeding 480 volts peak to peak. It is recognized that varistors having a lower breakdown voltage may be employed while still complying with the FCC Part 68 maximum ringing voltage specification. A capacitor C2, here 0.01 microfarads, assures the conduction of transistor Q4 after the breakdown of the neon lamp 60 during the negative half-cycles of the ringing AC voltage.

Similarly, in this illustrative embodiment, capacitor C4 is M6 is turned on slightly after the differential $V_{UR+}$, $V_{UR-}$ exceeds coupled from the gate to the source of N channel FET M6 so that FET the gate threshold voltage of FET M6. Diode D4 is provided to protect the gate of FET M6. Capacitor C4 is a one microfarad capacitor and the delay provided thereby ensures that the neon lamp 60 has sufficient time to conduct in response to the characteristic breakdown voltage. A common mode choke L1, including windings L1a, L1b, is serially coupled between unregulated voltage lines 48, 50 and voltage lines $V_{RS+}$, $V_{RS-}$, as shown. In operation, choke L1 provides AC isolation between the telephone lines 18 and the circuit portions 24, 12, and 26. In this way, the performance of the telephone 30 is substantially unaffected by the interface circuit 10 since the AC load on the telephone lines 18 is minimized. That is, distortion of audio frequency signals and data transmitted over telephone lines 18 is minimized by the use of common mode choke L1. Common mode choke L1 in FIG. 3 is not mandatory, but may optionally be used if additional $V_{UR+}$ to $V_{UR-}$ isolation from telephone lines 18 is desired.

As mentioned above, FCC guidelines govern the suitable load on the telephone lines 18 during an on hook, non-ringing condition. The on hook load (i.e., maximum leakage) is required to be less than twenty microamps for voltages of one-hundred volts or less. This requirement is met in the present case by the neon lamp 60 which is effectively an open circuit drawing practically no current until the lamp enters the low impedance state. That is, when a ringing voltage is absent from the telephone line, the neon lamp draws negligible current, such as less than one microamp.

Figure 4:
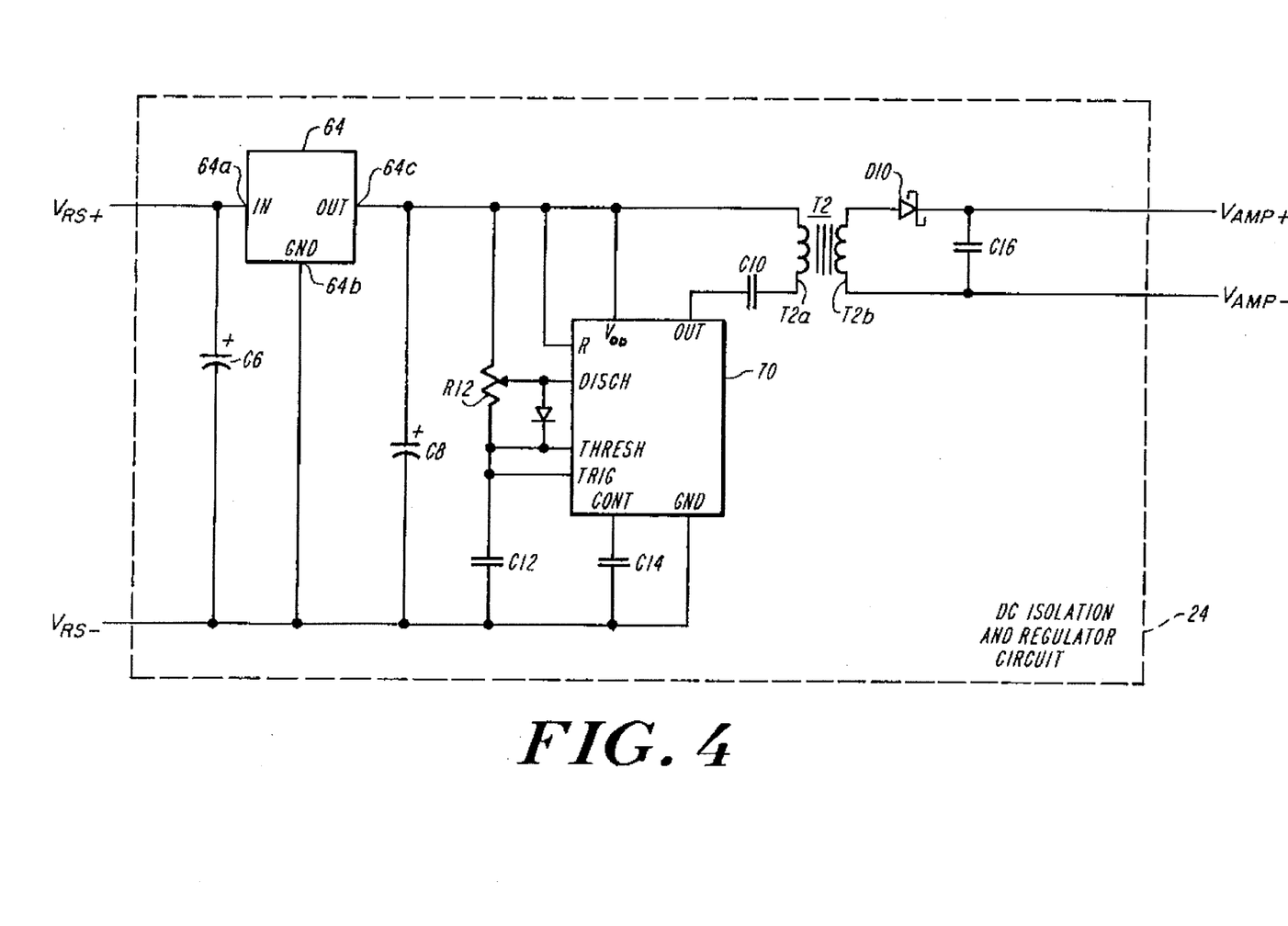
FIG. 4 is a schematic of the DC isolation and regulator circuit of FIG. 1.

Referring now to FIG. 4, the DC isolation and regulator circuit 24 will be described. The purpose of circuit 24 is to convert the ring suppressed voltage $V_{RS+}$, $V_{RS-}$ into regulated voltage $V_{AMP+}$, $V_{AMP-}$ for use by the amplifier 12. Additionally, circuit 24 provides DC isolation between the ring suppressed voltage $V_{RS+}$, $V_{RS-}$ and the regulated voltage $V_{AMP+}$, $V_{AMP-}$ in order to maintain proper telephone performance. The DC isolation is not essential for operation with PBX and Central Office systems. The sidetone of handset 40 or headset 14 refers to a portion of a transmitted voice signal that is coupled, or fed back to the receiver portion of the handset 40 or headset 14, respectively, so that the user can hear his own voice and adjust his speaking level accordingly. By preventing a DC path around the hybrid circuit of telephone 30, disturbance of both DC and AC characteristics of the telephone lines 18 is minimized. To this end, the circuit 24 includes a voltage regulator 64, such as an LM2936Z-5.0 three terminal fixed regulator IC. Capacitors C6 and C8, are provided for conventional operation in conjunction with the voltage regulator 64 and, in the illustrative circuit have values of 1.0 microfarads, and 47.0 microfarads, respectively. Terminal 64b of the voltage regulator 64 is the common terminal, as shown. In the present arrangement, approximately two milliamps of current enters the input terminal 64a of the voltage regulator 64, in response to which a regulated 5.0 volt output is provided at the output terminal 64c.

Also provided is a transformer T2 having a primary winding T2a with a first terminal capacitively coupled to an output terminal of a timer or pulse generator 70 through a 0.1 microfarad capacitor C10 and a second terminal coupled to the output terminal 64c of regulator 64. The secondary winding T2b of transformer T2 has a first terminal coupled to the anode of a Schottky diode D10 and a second terminal providing coupled to a capacitor C16. The cathode of the diode D10 is coupled to capacitor C16 as shown and the voltage $V_{AMP+}$, $V_{AMP-}$ is provided across capacitor C16. The timer 70 is a TLC555CP IC with variable resistor R12 and capacitors C12, C14 arranged for conventional use therewith. The frequency at which the timer 70 is operated is selected so as not to disturb audio performance. That is, if the timer frequency is too low, and approaches approximately 3.0 kilohertz, there may be audible interference in the telephone 30. Additionally, it has been found that in some telephones, timer frequencies up to ten kilohertz can result in undesirable audible interference. Thus, it is preferable that the timer 70 be operated at a frequency of at least 15.0 kilohertz and, more preferably, at approximately twenty kilohertz. It is understood however that higher timer frequencies can be employed. Using a transformer T2 having a 1:1 turns ratio, the duty cycle of the timer output signal is set at approximately 50% so as to provide an output voltage between $V_{AMP+}$, $V_{AMP-}$ of approximately 1.75 volts under load (i.e., when there is loop current on telephone lines 18 coupled to either a PBX, Key, or Central Office service system). While ordinarily it would be counter-indicated to provide a switching power supply (i.e., timer 70 in combination with transformer T2) following a linear regulator 64, in the present case, this arrangement provides benefits in the form of DC isolation and minimizing current draw, both of which are particularly desirable when interface 10 is used in conjunction with an electronic Key system. The DC isolation is provided to avoid unwanted data coupling and the minimization of current draw in turn, minimizes undesirable affects on transmit and receive performance and sidetone levels.

Figure 5:
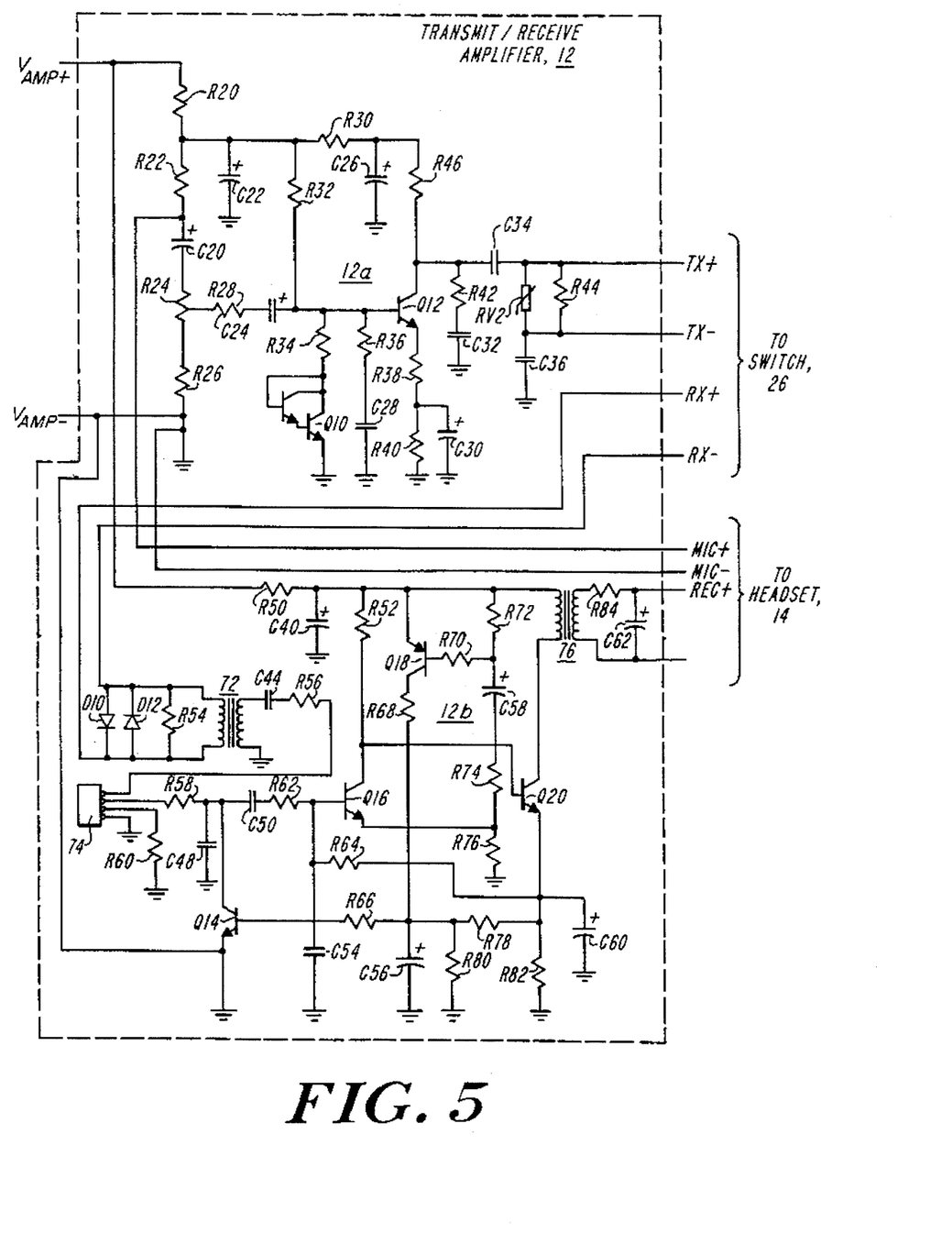
FIG. 5 is a schematic of the transmit/receive amplifier circuit of FIG. 1.

Referring to FIG. 5, the transmit/receive amplifier 12 includes both a transmit amplifier 12a and a receive amplifier 12b. In operation, the transmit amplifier 12a couples information from the headset 14 to the telephone 30; whereas, the receive amplifier 12b couples information from the telephone 30 to the headset 14. The regulated power $V_{AMP+}$, $V_{AMP-}$ extracted from the telephone lines 18 as described above is coupled to the amplifier 12, as shown. The transmit amplifier 12a draws approximately 1.0 milliamp and the receive amplifier 12b draws approximately 2.0 milliamps.

Considering first the transmit amplifier 12a, it is observed that such amplifier 12a is coupled between the TX+, TX− terminals of the switch 26 (FIG. 1) and the MIC+, MIC− terminals of the headset 14. More specifically, the MIC+, MIC− terminals of the headset 14 are coupled to the microphone 14a thereof. In operation, voice signals are coupled from the headset microphone 14a to the amplifier 12a at terminals MIC+, MIC− and are AC coupled across capacitor C20. Electret microphone 14a requires a bias voltage which is provided by resistors R20, R22.

In receive operation, when voice information is coupled from the telephone 30 to the headset 14, such information is processed by the receive amplifier 12b. Specifically, such voice information is passed from telephone 30, through switch 26 (FIG. 1) and to terminals RX+, RX− of the receive amplifier 12b. The voice signal thus processed is then coupled to the headset 14 through terminals REC+, REC−. Conventional receive amplifier 12b includes an automatic gain control (AGC) to regulate maximum acoustic receive levels at headset 14 and a volume control circuit 74 is provided for facilitating optimal volume control.

Figure 6:
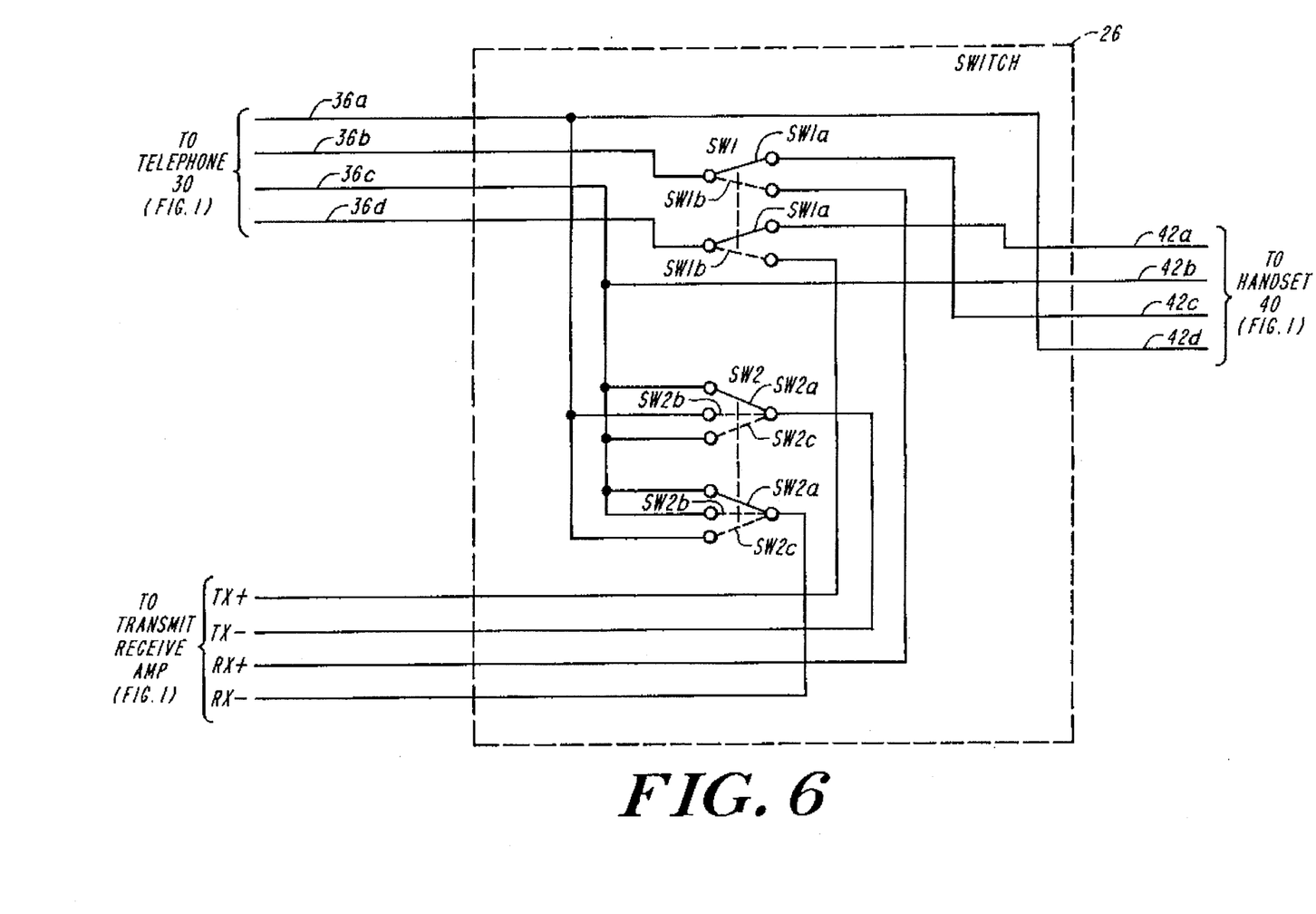
FIG. 6 is a schematic of the switch of FIG. 1.

Referring now to FIG. 6, the switch 26 is shown in greater detail. Switch 26 provides compatibility of the telephone headset interface circuit 10 with telephones 30 of various types. Additionally, switch 26 permits selection between headset 14 and handset 40 operation. More particularly, switch 26 includes two switches SW1 and SW2, with double pole, double throw transfer switch SW1 actuable to select either handset 40 or headset 14 operation. That is, when the transfer switch SW1 is in a first position labelled SW1a as shown, handset 40 operation is selected and telephone line wires 36b, 36d (FIG. 1) are coupled to wires 42c, 42a, respectively, of the handset 40. When transfer switch SW1 is in a second position labelled SW1b (shown by dotted lines), headset operation is selected and telephone line wires 36b, 36d are coupled to amplifier signal lines RX+, TX+, respectively.

Two pole, three position switch SW2 provides compatibility of interface circuit 10 with different telephone 30 and handset 40 wiring arrangements. That is, different telephone manufacturers provide different configurations of telephone lines 36. Switch SW2 is operable to select between the three common telephone wiring arrangements. In a first, conventional telephone line wiring arrangement, the middle two wires 36b, 36c are dedicated for receive operation and the outer two wires 36a, 36d are transmit wires. In a second wiring arrangement, the first two wires 36a, 36b comprise a receive pair and the second two wires 36c, 36d a transmit pair. Finally, a third wiring arrangement includes a first, DC bias wire 36a, a second receive wire 36b, a third ground wire 36c, and a fourth transmit wire 36d. In order to accommodate any one of these three common handset wiring arrangements, switch SW2 has three positions SW2a, SW2b, and SW2c, as shown.

Figure 7:
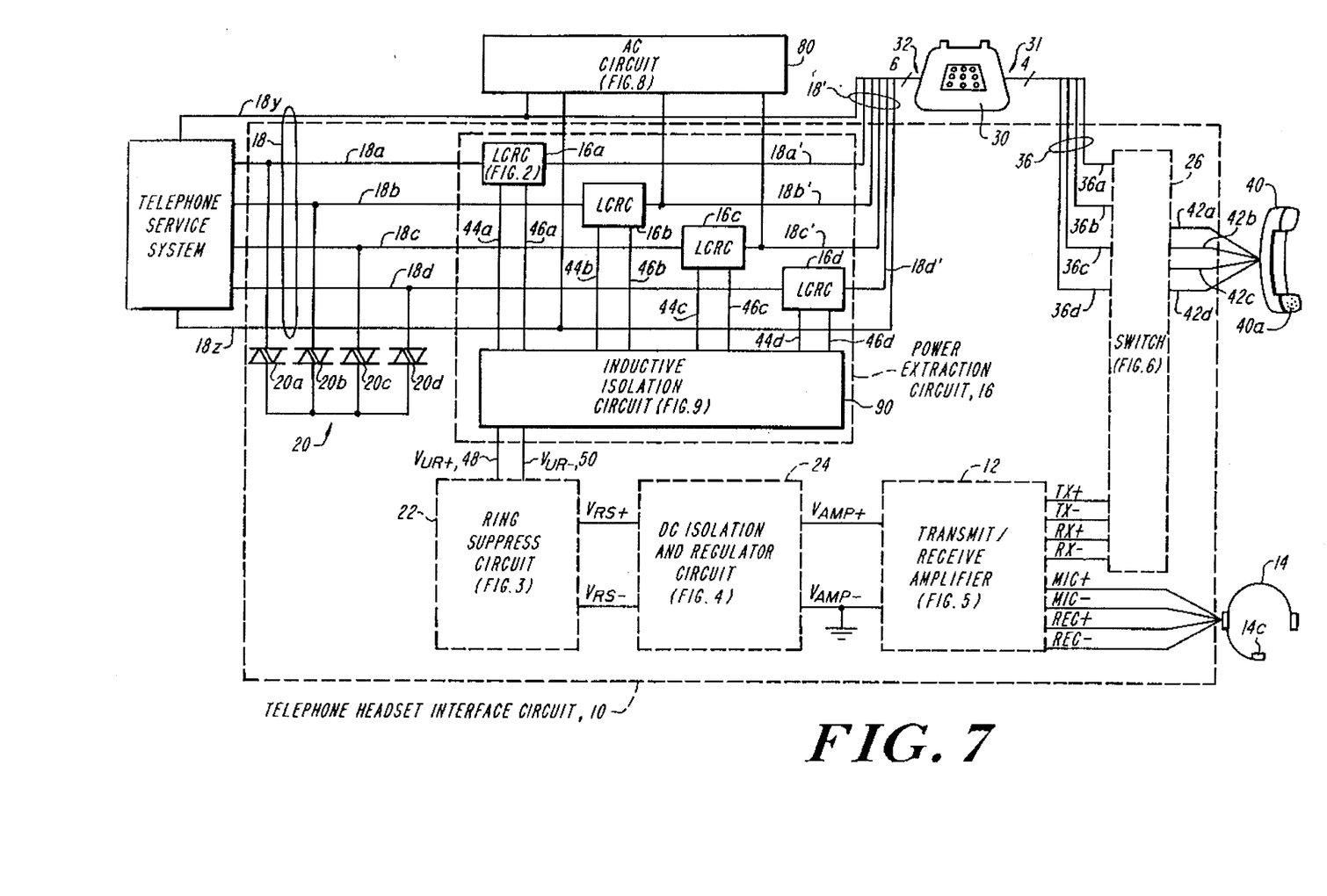
FIG. 7 is a block diagram of an alternative embodiment of the telephone headset interface circuit in accordance with the invention.

With reference now to FIG. 7, an alternative embodiment of the telephone headset interface circuit 10 of the present invention is shown. The alternative embodiment includes additional options such as an AC power line pair 18y and 18z supplied to the telephone 30, an AC circuit 80, and an inductive isolation circuit 90.

Certain types of telephone instruments, for example Northern Telecom M2616, are loop powered when connected in their most basic mode, but require external power when optional accessories are added. Options can include key strips for accessing additional extensions or data cards for interfacing with video terminals. In such cases, 30 VAC power is applied to the outermost two wires 18y, 18z of the common six wire telephone cord in addition to the 30 VDC loop power which is always available at the innermost pair.

The telephone instrument is designed such that when external AC power is present on the lines 18y, 18z, the DC loop current that would normally flow through the inner pair of conductors 18b, 18c is absent. The absence of loop current inhibits the power extraction by the LCR circuits 16 and therefore inhibits the headset amplifier operation. Furthermore, the absence of loop current disturbs telephone line impedance by adding a high series loss at each LCR circuit, since neither transistor Q1 nor Q2 of the LCR as shown in FIG. 2 is conducting. Both situations are corrected for by the AC circuit 80 which may be optionally added for operation with such telephones. The added circuit can be permanent, that is it can remain connected at all times in two, four or six wire telephone systems and causes no harm to the system when not needed.

Figure 8:
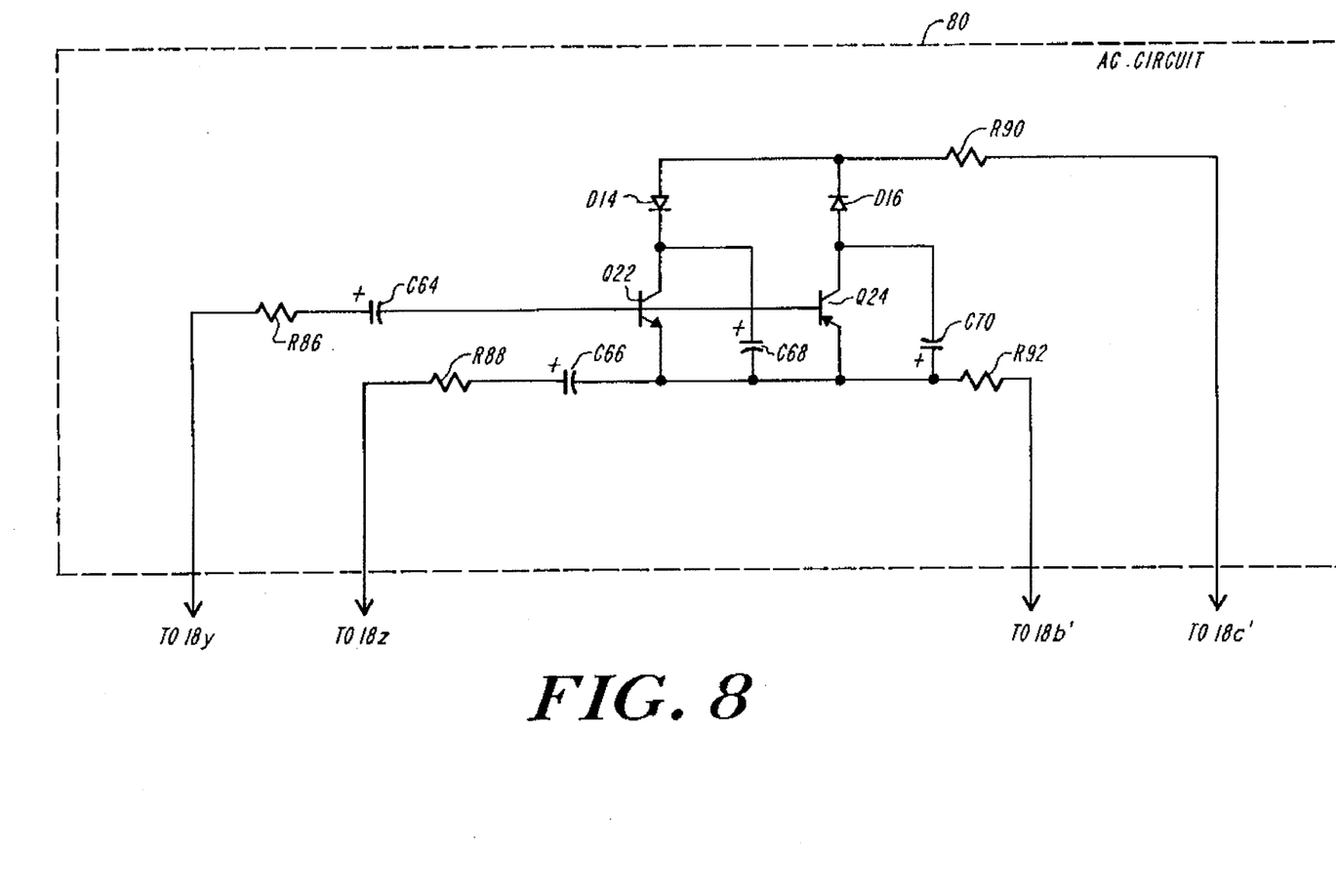
FIG. 8 is a schematic of an exemplary power compensation circuit in accordance with the invention.

With reference to FIG. 8, an exemplary embodiment of the AC circuit 80 in accordance with the present invention is shown. In operation, when external AC power is present on the pair 18y, 18z, it causes AC current to flow through resistor R86 and capacitor C64 to the parallel combination of base-emitter junctions of transistors Q22 and Q24 to capacitor C66 and resistor R88. When the AC wave form is positive, the base-emitter junction of NPN transistor Q22 is conducting. When negative, the base-emitter junction of PNP transistor Q24 is conducting. It will be appreciated that 30 volts DC for loop power is normally present on lines 18b, 18c, however, the polarity of the voltage is unknown. If line 18c is positive, the transistor Q22 will turn on and sink current through the path which includes resistor R90, diode D14, the collector-emitter of transistor Q22, and resistor R92 if the AC waveform is positive. Transistor Q22 will thus discharge capacitor C68.

When the AC waveform turns negative, transistor Q24 turns on and Q22 turns off, but diode D16 is still reverse biased and blocks any DC current to transistor Q24 or capacitor C70, however, current continues to flow through diode D14 to charge capacitor C68. If line 18b is positive, the same process takes place with diode D16, transistor Q24 and capacitor C70, but current flows in the opposite direction.

When the values for resistors R90 and R92, as well as capacitors C68 and C70 are chosen properly, for example 18 k ohms and 4.7 µF, approximately 0.8 mA DC current will be shunted across telephone line pair 18b' and 18c' with negligible ripple and therefore no audible AC hum. This current is low but sufficient to turn on the respective transistors in LCR circuits 16b, 16c, thus extracting power for the headset amplifier, and also avoiding the high series impedance.

In the absence of AC power, the base-emitter junctions of transistors Q22 and Q24 are not conducting, therefore the circuit reaches a quiescent state with either capacitor C68 or C70 charged up to line voltage with no shunt current from lines 18b' to 18c'. In fact, FCC Part 68 specifies maximum DC leakage at 20 µA, thus compliance is maintained with or without circuitry for AC operation.

Certain PBX and most Key systems require a four wire connection to the telephone instrument. The inner pair typically carries voice and the outer pair carries data. The telephone is "phantom powered" by the system which applies one DC power polarity to one pair and the opposite polarity to the other pair.

When the telephone headset interface circuit 10 in accordance with the present invention is connected to such a telephone, all four LCR circuits 16 as shown in FIG. 7 are conducting. Lines 18a and 18d conduct DC current in one direction, and lines 18b and 18c conduct in the opposite direction. Undesirable shunt loading of the voice pair would possibly occur, if for example lines 44b and 44c were tied together at line 48 since they originate from LCR circuits with like polarity transistors and diodes conducting. Such loading can disturb line impedance and sidetone performance. Similar loading to the data pair would possibly occur if corresponding lines 46a and 46d were tied together at line 50, resulting in data errors.

It is desirable to prevent such shunt loading in the power extraction process and to present nearly an open circuit to the voice and data pairs. This isolation can be realized if each of the lines 44a–44d and 46a–46d carried a high value series inductor before being tied together at lines 48 and 50, respectively. Eight such inductors at 150 mH each can be connected to provide such isolation. Preferably, small inexpensive transformers (for example 600 ohm center tapped to 600 ohm center tapped) can be connected to function as four inductors with a common tie point.

Figure 9:
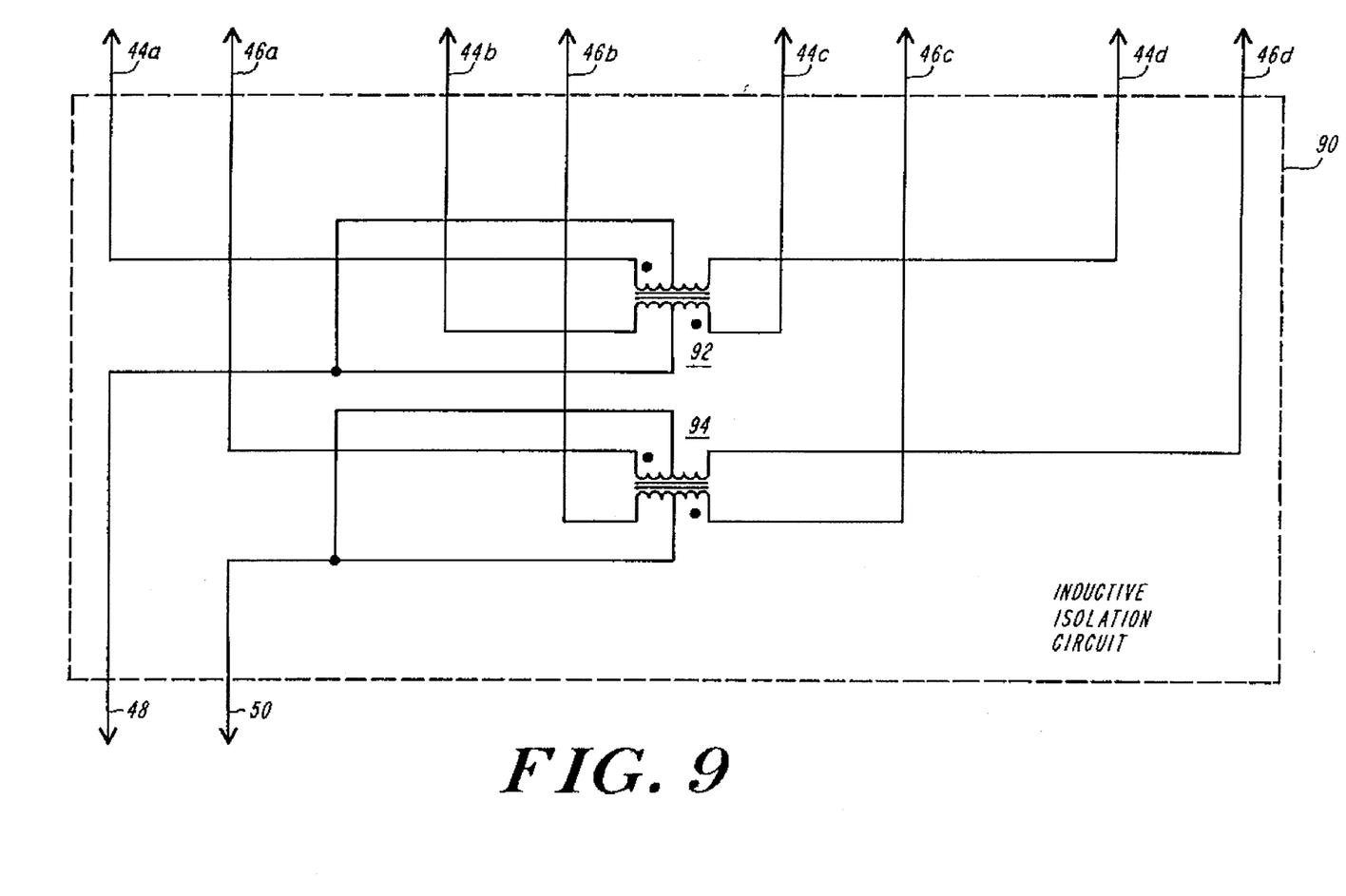
FIG. 9 is a schematic of an exemplary isolation circuit in accordance with the invention.

With reference to FIG. 9, when like current polarities are applied to opposite ends of any transformer winding with respect to its center tap, cancellation occurs and the resulting high impedance benefit is much greater than from equal value but separate inductors. In the embodiment illustrated, two such transformers are utilized, transformer 92 to isolate each of the four positive lines 44a–44d, and transformer 94 for the four negative lines 46a–46d. It will be appreciated that operation in two wire telephone systems is not affected by the unused windings.

Having described the preferred embodiments of the invention, it will be apparent to one of skill in the art that other embodiments incorporating their concepts may be used. Accordingly, the invention should be limited only by the spirit and scope of the appended claims.

What is claimed is:

1. A telephone interface for use with a telephone, said telephone having a first connector for connection to a telephone line and a second connector for connection to a telephone voice accessory, wherein said telephone line includes at least a first and second pair of wires, said telephone interface comprising:

a power extraction circuit coupled to said first pair of wires for providing a predetermined output voltage in response to a specified DC voltage provided on said first pair of wires and in the absence of AC voltage on said second pair of wires, a power compensation circuit coupled to both said first and second pairs of wires for controlling said power extraction circuit to provide said predetermined output voltage in response to the presence of AC voltage on said second pair of wires, wherein said power compensation circuit controls said power extraction circuit to maintain substantially the same electrical impedance characteristics to said first pair of wires regardless of the presence or absence of AC voltage on said second pair of wires; and an amplifier coupled to said second connector and to said power extraction circuit, said amplifier being powered by said output voltage.

2. The telephone interface of claim 1, wherein said power extraction circuit comprises a plurality of power extraction circuit portions, each one adapted for coupling to a corresponding wire of said first pair of wires.

3. The telephone interface of claim 2, wherein each one of said power extraction circuit portions comprises:

a resistor coupled in series with said corresponding one of said wires in said first pair, said resistor having a first terminal coupled to said corresponding wire of said first pair and a second terminal coupled to said first connector; and a rectifier operable in response to a predetermined voltage drop thereacross, said rectifier providing a rectified current.

4. The telephone interface of claim 3, wherein said rectifier comprises a complementary pair of transistors, each one having a first electrode coupled to said first resistor terminal, a second electrode at which said rectified current is provided, and a control electrode coupled to said second resistor terminal, wherein a first one of said complementary pair of transistors conducts when said predetermined voltage drop is of a first polarity and said second one of said complementary pair of transistors conducts when said predetermined voltage drop is of a second, opposite polarity.

5. The telephone interface of claim 4, wherein said power compensation circuit comprises a rectifier circuit coupled between said second pair of wires and said first connector for providing a DC shunt current across said first pair of wires so that each of said power extraction circuit portions conducts said rectified current.

6. The telephone interface of claim 5, wherein said rectifier circuit comprises a complementary pair of transistors, each one having a first electrode coupled to a first wire of said first pair through a first resistor and a first wire of said second pair, a second electrode coupled to a second wire of said first pair through a second resistor, and a control electrode coupled to a second wire of said second pair for receiving said AC voltage, each of said transistors further comprises a capacitor coupled across said first and second electrodes.

7. The telephone interface of claim 6, wherein in response to the presence of said AC voltage of a first polarity on said second wire of said second pair and said DC voltage of the same polarity on said second wire of said first pair, a first one of said complementary pair of transistors conducts and forces a discharge of the associated capacitor, thus said DC shunt current is allowed to flow across said first pair.

8. The telephone interface of claim 7, wherein in response to the presence of said AC voltage of a first polarity on said second wire of said second pair and said DC voltage of the same polarity on said first wire of said first pair, the second one of said complementary pair of transistors conducts and forces a discharge of the associated capacitor, thus said DC shunt current is allowed to flow across said first pair.

9. A telephone interface for use with a telephone, said telephone having a first connector for connection to a telephone line and a second connector for connection to a telephone voice accessory, wherein said telephone line includes at least a first and second pair of wires, said telephone being powered by a DC voltage of one polarity provided on said first pair and the DC voltage of the opposite polarity on said second pair, said telephone interface comprising:

a power extraction circuit coupled to said first and second pairs of wires and having first and second output terminal sets for providing portions of a predetermined output voltage of one polarity on said first output terminal set and of the opposite polarity on said second output terminal set;

an isolation circuit coupled to both said first and second output terminal sets for preventing shunt loading of said first and second pairs of wires and for providing electrical impedance characteristics to said first and second pairs of wires representative of an open circuit, said isolation circuit further operable for combining said portions into said output voltage; and an amplifier coupled to said second connector and to said isolation circuit, said amplifier being powered by said output voltage.

10. The telephone interface of claim 9, wherein said power extraction circuit comprises a plurality of power extraction circuit portions, each one adapted for coupling to a corresponding wire of said first and second pair of wires, each of said portions having a first output associated with said first output terminal set and a second output associated with said second output terminal set.

11. The telephone interface of claim 10, wherein said isolation circuit comprises first and second center tapped to center tapped transformers.

12. The telephone interface of claim 11, wherein said first transformer comprises a first winding coupled at opposite ends to said first outputs of the power extraction circuit portions coupled to said first pair of wires, and a second winding coupled at opposite ends to said first outputs of the power extraction circuit portions coupled to said second pair of wires, each winding having a center tap coupled to said first output terminal set.

13. The telephone interface of claim 12, wherein said second transformer comprises a first winding coupled at opposite ends to said second outputs of the power extraction circuit portions coupled to said first pair of wires, and a second winding coupled at opposite ends to said second outputs of the power extraction circuit portions coupled to said second pair of wires, each winding having a center tap coupled to said second output terminal set.

* * * * *